United States Patent [19]

Toy et al.

[11] 3,897,491

[45] July 29, 1975

[54] PROCESS FOR PREPARING ALKYL OR ARYL PHOSPHORUS HALIDES AND MIXED ISOMERS THEREOF

[75] Inventors: Arthur D. F. Toy, Stamford, Conn.; Eugene H. Uhing, Ridgewood, N.J.

[73] Assignee: Stauffer Chemical Company, New York, N.Y.

[22] Filed: June 10, 1971

[21] Appl. No.: 151,955

[52] U.S. Cl. ... 260/543 P; 260/45.7 P; 260/45.7 PS
[51] Int. Cl. ................................................. C07f 9/42
[58] Field of Search ................................ 260/543 R

[56] References Cited
UNITED STATES PATENTS

| | | | |
|---|---|---|---|
| 2,345,690 | 4/1944 | Solmssen | 260/543 P |
| 2,772,308 | 11/1956 | Jensen et al. | 260/543 P |
| 2,847,458 | 8/1958 | Chas et al. | 260/543 P X |
| 3,143,569 | 8/1964 | Abrams et al. | 260/543 P |
| 3,149,137 | 9/1964 | Huffman et al. | 260/543 P X |
| 3,256,370 | 6/1966 | Fitch et al. | 260/543 P X |
| 3,461,189 | 8/1969 | Nagel | 260/543 P |
| 3,579,576 | 5/1971 | Angstadt | 260/543 P X |

FOREIGN PATENTS OR APPLICATIONS

| | | | |
|---|---|---|---|
| 1,184,767 | 3/1970 | United Kingdom | 260/543 P |

OTHER PUBLICATIONS

Ethyl Corp., Development Products Bulletin, Feb. 1969.

Richard et al., J.A.C.S., Vol. 83, (1961), pp. 1722–1726.

Kosolapoff, Organo Phos. Cmpds., (1950), pp. 162.

Kosolapoff, Organo Phos. Cmpds., (1950), pp. 152.

Sommer, Z. Anorg. Alleg. Chem., 1970, 376 (1), pp. 37–43.

Sommer, Zeit. fur Anog. Alleg. Chemie, Vol. 376, 1970, pp. 37–43.

*Primary Examiner*—Anton H. Sutto
*Assistant Examiner*—Richard D. Kelly

[57] ABSTRACT

Alkyl or aryl phosphonic or phosphonothioic dihalides and phosphinic or phosphinothioic monohalides are prepared by reacting an alkyl halide or aryl halide respectively with a tri-valent phosphorus compound having at least two halogens attached thereto, and preferably three halogens such as phosphorus trihalide, in the presence of $P_4O_{10}$ or $P_4S_{10}$ under at least autogenous pressure at a temperature of from 200°C. to 450°C. The compounds obtained are useful as constituents in insecticides, fungicides, pharmaceuticals, and as intermediates in preparation of other organophosphorus compounds.

51 Claims, No Drawings

PROCESS FOR PREPARING ALKYL OR ARYL PHOSPHORUS HALIDES AND MIXED ISOMERS THEREOF

The present invention relates to a new and improved process for the preparation of alkyl or aryl phosphonic or phosphonothioic dihalides, and phosphinic or phosphinothioic monohalides.

BACKGROUND OF THE INVENTION

Alkyl phosphonic dihalides have been prepared in the prior art by reacting alkyl halides with phosphorus tri-halides in the presence of aluminum chloride. The reaction proceeds at room temperature according to the formula set forth in Heuben-Weyl, Methoden der Organis Chenchemie at Volum 12, Part 1 (1965) at page 396:

I 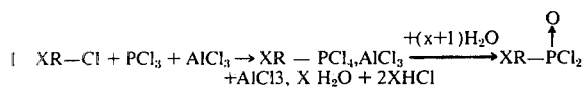

The Heuben-Weyl reference also notes that the reaction has been attempted in the absence of the aluminum chloride catalyst with little success.

Phosphorus pentoxide and phosphorus pentasulfide are known reactants in the field of organophosphorus chemistry as evidenced by U.S. Pat. Nos. 2,471,472, 2,482,810, 2,495,799, and 2,685,602. It is also known (U.S. Pat. No. 2,622,917, Example IV) that phenyldichlorophosphine can be reacted at a moderate or relatively low temperature in the presence of an aluminum chloride catalyst with phosphorus trichloride and phosphorus pentasulfide to provide benzenethionophosphonyl dichloride ($C_6H_5P(S)Cl_2$). Removal of the catalyst provides significantly decreased yields. This patent also teaches that benzene can be reacted with phosphorus trichloride in the presence of aluminum chloride and phosphorus pentasulfide at moderate temperatures (40°C), cf. Ex. VII.

It is also known (U.S. Pat. No. 2,882,303) that alkyl phosphonyl dihalides, i.e., methane phosphonyl dichloride can be prepared in an autoclave from methyl chloride, phosphorus trichloride and a phosphoryl compound II 

such as phosphoryl trichloride using phosphorus diiodide as catalyst.

It is also known that chlorobenzene will react with phosphorus pentoxide at an optimum temperature of 275°C. at a reaction time of 24 hours (Lecher et al, Am. Chem. Soc. 76, Pages 1045–1051, 2/20/1954). The product obtained is an anhydride of phosphorus having the formula III 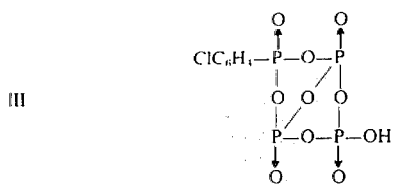

as well as a polymeric anhydride of the phosphonic acid corresponding to the formula $(ClC_6H_4PO_2)x$.

THE INVENTION

In accordance with the present invention there is provided a new method for preparing compounds of the formula IV 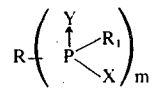

wherein R is a $C_1$ to $C_{20}$ alkyl radical, cycloalkyl of 5–6 carbons in the ring, an aryl radical of up to 3 fused rings or biphenyl, X is a halogen of chlorine, or bromine, $R_1$ represents groups as defined under R and X above, and Y is a chalcogen of oxygen or sulfur. The method comprises reacting an alkyl or aryl halide of the formula:

V 

wherein $n$ is an integer greater than zero, with a trivalent phosphorus compound of the formula:

VI 

in the presence of a phosphorus compound of the formula:

VII 

wherein R, $R_1$, X, and Y are as defined above, and $m$ is an integer between 1 and $n$ inclusive. The reaction is conducted at a temperature of from about 200°C. to about 450°C. under at least autogenous pressure. The process of the present invention requires no separate catalyst in order to effect reaction. The preferred reactant is the chloro compound. The preferred system uses phosphorus trichloride. Some of the dihalide or monohalide products are known and have utility as chemical intermediates, particularly in the preparation of insecticides, fungicides, pharmaceuticals, and other organophosphorus compounds.

In formula IV, Y can be oxygen or sulfur. One is not preferred over the other in the method except on the basis of the final use of the prepared compounds, i.e., the sulfur analogues find more use in the insecticide/fungicide field.

In formula IV, X is a halogen of chlorine or bromine, preferably chlorine. For most intermediate type reactions, chlorine is preferred as it is inexpensive and reacts readily. Bromine, though equivalent to chlorine, is more expensive and can be used with facility if desired, particularly for special purposes, e.g., in the preparation of bromine containing intermediates for flame retardant compounds. Basically, and for practical purposes, chlorine is the preferred entity.

In formula IV, R can be a $C_1$ to $C_{20}$ alkyl group and preferably the $C_1$ to $C_4$ alkyl group. The term alkyl is also intended to include alkyl groups modified by non-interfering substituents such as aryl, e.g., benzene or naphthalene groups; haloaryl, e.g., chlorobenzene or bromonaphthalene; and the like. The alkyl groups are represented by methyl, ethyl, n-propyl, and isopropyl, n-butyl, isobutyl, and tert-butyl, as well as pentyl, hexyl, heptyl, octyl, nonyl, decyl, dodecyl tetradecyl, hexadecyl, octodecyl, and eicosyl. Since the definition of the alkyl halide includes compounds having more than one halogen attached thereto, and since it is possible to displace less than the number of available halogen atoms, the R group attached to the phosphorus can be a halosubstituted R group. These halosubstituted R groups can be illustrated by chloromethyl, chloroethyl, chloropropyl, chlorobutyl, chloroamyl, chlorodecyl, chlorohexadecyl, chloroeicosyl, and the like as well as the bromine and derivatives thereof.

R can also be an aryl of up to (and including) 3 fused rings.

These aromatic compounds include the benzene series of ring compounds, the naphthalene series of compounds as well as the anthracene series and preferably those of the benzene series. Included within each series are those compounds wherein the ring hydrogens are substituted with non-interfering groups. Some of these non-interfering groups can be illustrated by the $C_1$ to $C_4$ alkyl derivatives and the chloro, and bromo substituted rings which are given only as illustrative of the many equivalent groups which could be used by one skilled in the art. These radicals can be illustrated by phenyl, chlorophenyl, bromophenyl, methylphenyl, i.e., (tolyl), ethylphenyl, propylphenyl, and butylphenyl, naphthyl, methylnaphthyl, ethylnaphthyl, propylnaphthyl, butylnaphthyl, chloronaphthyl, bromonaphthyl, anthryl, methylanthryl, propylanthryl, butylanthryl, chloroanthryl, and bromoanthryl, as well as mixed forms thereof such as dimethylphenyl, methylchlorophenyl, dimethylnaphthyl, methylchloronaphthyl, diethylanthryl, ethylchloroanthryl, and the like.

Any of these radicals can contain one or more alkyl radicls and/or one or more halogen groups. Any isomeric form of these radicals can be used.

The R group can also be biphenyl. Also included in the term biphenyl are the $C_1$ and $C_4$ derivatives such as methylbiphenyl and ditolyl and the halosubstituted derivatives of biphenyl. The substituents can be one or more as desired in any isomeric position desired. The R group can be attached to the phosphorus o, m, or p to the biphenyl linkage though the ortho position is preferred. The chloro derivatives are contemplated as particularly usable.

The $R_1$ group can be the same as discussed above in connection with R or, additionally, a halogen of chlorine, or bromine. The $R_1$ is preferably a halogen and more preferably the same halogen as the X group. Preferably the halogen is chlorine. When $R_1$ is a halogen the compounds prepared are termed phosphonic or phosphonothioic dihalides. When $R_1$ is not halogen, the compounds are termed phosphinic or phosphinothioic monohalides. The preferred group of compounds prepared by the invention are the phosphonic or phosphonothioic dihalides.

The compounds of the present invention are prepared by reacting a trivalent phosphorus compound and a $P_4Y_{10}$ phosphorus compound with an alkyl or aryl halide having one or more than one attached halogen. Thus, and if only one mole or less of the trivalent phosphorus compound is used a majority of the product will be a monophosphorus compound. An increase in the molecular amount of the phosphorus compound used relative to the number of halogens present will allow for the preparation of compounds having multiple phosphorus groups. The number of phosphorus attachments is ultimately limited to the number of halogens attached to the alkyl or aryl halides. Stearic hindrance and reaction conditions will also ultimately limit the final number of attached phosphorus groups.

Thus, the present invention allows for the preparation not only of monophosphorus esters of the formula:

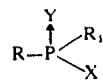

but also polyphosphorus esters such as:

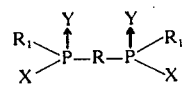

and

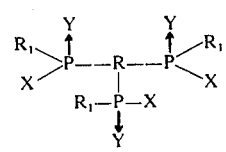

These are all generically included within the formula:

Illustrative of the compounds whch can be prepared by the method of the present invention are:

| | MONO PHOSPHORUS |
|---|---|
| Alkyl | $CH_3P(O)Cl_2$ |
| | $CH_3P(S)Cl_2$ |
| | $CH_3P(O)Br_2$ |
| | $CH_3P(S)Br_2$ |
| | $C_2H_5P(O)Cl_2$ |
| | $C_2H_5P(S)Cl_2$ |
| | $C_2H_5P(O)Br_2$ |
| | $C_3H_7P(S)Cl_2$ |
| | $C_4H_9P(O)Cl_2$ |
| | $C_4H_9P(S)Cl_2$ |
| | $C_4H_9P(O)Br_2$ |
| | $C_5H_{11}P(O)Cl_2$ |
| | $C_8H_{17}P(O)Cl_2$ |
| | $C_8H_{17}P(S)Br_2$ |
| | $C_{18}H_{37}P(O)Cl_2$ |
| | $C_{18}H_{37}P(S)Cl_2$ |
| | $(CH_3)_3C-CH_2P(O)Cl_2$ |
| | $(CH_3)_3C-CH_2P(S)Cl_2$ |
| | $CH_3(CH_2)_4CH(C_2H_5)CH_2P(O)Cl_2$ |
| | $CH_3(CH_2)_4-CH-(C_2H_5)CH_2P(S)Cl_2$ |
| | DI PHOSPHORUS |
| | $Cl_2P(O)-CH_2-P(O)Cl_2$ |
| | $Cl_2P(S)-CH_2-P(S)Cl_2$ |
| | $Cl_2P(O)C_2H_4P(O)Cl_2$ |
| | $Cl_2P(S)C_2H_4P(S)Cl_2$ |
| | $Cl_2P(O)C_4H_8P(O)Cl_2$ |
| | $Cl_2P(S)C_8H_{16}P(S)Cl_2$ |
| | $Cl_2P(O)CH_2-\langle\rangle-CH_2P(O)Cl_2$ |
| | $Cl_2P(S)CH_2-\langle\rangle-CH_2P(S)Cl_2$ |
| Dialkyl and Mixed Alkyl | $(CH_3)_2P(O)Cl$ |
| | $(CH_3)_2P(S)Br$ |
| | $(C_2H_5)_2P(O)Br$ |
| | $(C_2H_5)_2P(S)Br$ |
| | $(C_4H_9)_2P(S)Cl$ |
| | $(C_8H_{17})_2P(O)Cl$ |

MONO PHOSPHORUS -Continued

Haloalkyl
- $(C_8H_{17})_2P(O)Br$
- $(C_{18}H_{37})_2P(S)Cl$
- $(C_{18}H_{37})_2P(O)Br$
- $(CH_3)(C_2H_5)P(O)Cl$
- $(C_2H_5)(C_{18}H_{37})P(O)Cl$
- $(C_2H_5)(C_{18}H_{37})P(S)Cl$
- $(C_2H_5)(C_{18}H_{37})P(S)Br$
- $ClCH_2P(O)Cl_2$
- $ClCH_2P(S)Cl_2$
- $ClCH_2(CH_2)_6P(O)Cl_2$
- $ClCH_2(CH_2)_6P(S)Cl_2$
- $ClCH_2(CH_2)_8P(O)Cl_2$
- $ClCH_2(CH_2)_{18}P(S)Cl_2$
- $ClCH_2(CH_2)_{18}P(O)Cl_2$ Dihaloalkyl and mixed Haloalkyl
- $(ClCH_2)_2P(O)Cl$
- $(ClCH_2)_2P(S)Br$
- $(ClC_2H_4)_2P(O)Cl_2$
- $(ClC_3H_7)_2P(S)Cl_2$
- $(ClCH_2(CH_2)_8)_2P(O)Cl_2$
- $(ClC_2H_4)(ClCH_2(CH_2)_{18}P(O)Cl_2$
- $(ClCH_2)(BrCH_2)P(O)Cl$

CYCLIC COMPOUNDS*

Aromatic Series

| Benzene Series | Ring Substituent | Y | $R_1$ | X |
|---|---|---|---|---|
| | — | O | Cl | Cl |
| | — | S | Cl | Cl |
| | — | O | Br | Br |
| | — | S | Br | Br |
| | $CH_3$ | O | Cl | Cl |
| | $CH_3$ | S | Cl | Cl |
| | Cl | O | Cl | Cl |
| | Cl | S | Cl | Cl |
| | $C_2H_5$ | S | Cl | Cl |
| | $C_4H_9$ | S | Cl | Cl |
| Naphthalene Series | | | | |
| | — | O | Cl | Cl |
| | — | S | Cl | Cl |
| | — | O | Br | Br |
| | — | S | Br | Br |
| | $CH_3$ | S | Cl | Cl |
| | $C_2H_5$ | S | Br | Br |
| | Cl | O | Cl | Cl |
| | Br | S | Br | Br |
| | $-P(O)Cl_2$ | O | Cl | Cl |
| | $-P(S)Cl_2$ | S | Cl | Cl |
| Anthracene Series | | | | |
| | — | S | Cl | Cl |
| | — | O | Cl | Cl |
| | $-P(O)Cl_2$ | O | Cl | Cl |
| | $-P(S)Cl_2$ | S | Cl | Cl |
| | $CH_3$ | S | Cl | Cl |
| | $C_2H_5$ | S | Cl | Cl |
| | Cl | S | Cl | Cl |
| Biphenyl Series | | | | |
| | — | O | Cl | Cl |
| | — | S | Cl | Cl |
| | — | O | Br | Br |
| | — | S | Br | Br |
| | 4'—$CH_3$ | S | Cl | Cl |
| | 4'—Cl | S | Cl | Cl |
| | 4'$P(O)Cl_2$ | O | Cl | Cl |
| | 4'$P(S)Cl_2$ | S | Cl | Cl |

Aliphatic Series

5 Membered Carbon Ring

| | | | | |
|---|---|---|---|---|
| | — | O | Cl | Cl |
| | — | S | Cl | Cl |
| | $-P(O)Cl_2$ | O | Cl | Cl |
| | $-P(S)Cl_2$ | S | Cl | Cl |

6 Membered Carbon Ring

| | | | | |
|---|---|---|---|---|
| | — | O | Cl | Cl |
| | — | S | Cl | Cl |
| | $-P(O)Cl_2$ | O | Cl | Cl |
| | $-P(S)Cl_2$ | S | Cl | Cl |

*Reference characters correspond to formula IV

The compounds of the present invention are prepared by reacting a trivalent phosphorus compound and a $P_4Y_{10}$ compound with an alkyl or aryl halide of the formula:

$$RX_n$$

wherein R, X, and n are as defined hereinbefore. Representative compounds within this formula are methyl chloride, propyl chloride, butyl chloride, hexyl chloride, octyl chloride, decyl chloride, dodecyl chloride, hexadecyl chloride, octydecyl chloride, eicoxyl chloride, and the corresponding bromo substituted derivatives; chlorobenzene, bromobenzene, dichlorobenzene, dibromobenzene, chlorotoluene, (chloro) ethylbenzene, (bromo)ethylbenzene, (chloro)propylbenzene, (bromo)propylbenzene, (chloro)butylbenzene, (bromo)butylbenzene, chloronaphthalene, bromonaphthalene, (chloro)methylnaphthalene, (bromo)methylnaphthalene, (chloro)ethylnaphthalene, (bromo)ethylnaphthalene, (chloro)propylnaphthalene, (bromo)butylnaphthalene, chloroanthracene, (chloro)methylanthracene, bromoanthracene, dichloroanthracene, (chloro)butylanthracene, chlorodimethylbenzene, methyldichlorobenzene, bromo-dimethylnaphthalene, methyldichloronaphthalene, chlorodiethylanthracene, ethyldichloroanthracene, and the like. In the aliphatic series above the $C_2$ alkyl and in the aromatic series, isomeric forms of the same compound are formed. These are intended to be included in the definition of the compound. The foregoing compounds are given as illustrative and are in no way considered to be totally inclusive of all of the alkyl and aryl halides which can be used in the method of the present invention.

The trivalent phosphorus compound used in the present invention can be depicted by the formula (VI):

$$R_1P(X)_2$$

the radical X is a halogen of chlorine or bromine. The discussion given hereinbefore regarding the halogen on the alkyl or aryl halide is equally applicable here. Thus, and for most chemical intermediate purposes, the chlorine is preferred. The bromine species can be prepared if desired.

The $R_1$ group includes the same moieties listed and discussed above in connection with the R group of the alkyl and aryl halide. That material is equally applicable in reference to the trivalent phosphorus compound. Further, $R_1$ can be, and preferably is, a halogen of chlorine, or bromine. For the considerations discussed above, the halogen is preferably chlorine.

Representative trivalent phosphorus compounds are phosphorus trichloride, phosphorus tribromide, mixed phosphorus halides such as dichlorophosphorus bromide and dibromophosphorus chloride; methylphosphonous dichloride, ethylphosphonous dibromide isopropylphosphonous dichloride, benzylphosphonous dichloride, phenylphosphonous dichloride, cyclohexylphosphonous dichloride, decylphosphonous dichloride, hexadecylphosphonous dichloride, eicosylphosphonous dichloride, naphthylphosphonous dichloride, anthracylphosphonous dichloride, and the like. For economical reasons, the trivalent phosphorus compound is preferably phosphorus trichloride. Mixtures of trivalent phosphorus halide can be used without departing from the scope of the invention.

The reaction of the alkyl or aryl halide and the trivalent phosphorus compound is conducted in the presence of a phosphorus compound of the formula (VII):

$$P_4Y_{10}$$

wherein Y is a chalcogen of oxygen or sulfur. Thus, two specific compounds are included within the formula, i.e., $P_4O_{10}$ and $P_4S_{10}$. These compounds are well know to the prior art as phosphorus pentoxide (depicted by the formula $P_2O_5$) and phosphorus pentasulfide (depicted by the formula ($P_2S_5$). The formulas $P_2O_5$ and $P_2S_5$ are the lowest numerical formula designations and have been adopted by the old prior art though later experiments show the actual compounds to have a molecular formula of $P_4O_{10}$ or $P_4S_{10}$ respectively. The two formulas and the names discussed herein are considered equivalent for the purposes of this specification.

Stoichiometrically, the present reaction appears to require a ratio of 6 moles of the alkyl or aryl halide and 6 moles of the trivalent phosphorus compound to one mole of the $P_4O_{10}$ or $P_4S_{10}$ compound to prepare monophosphonate or monophosphinate compounds. Using these numbers, a theoretical reaction scheme can be postulated as follows:

VIII $$6RX + 6R_1P(X)_2 + P_4Y_{10} \rightarrow 6RP(Y)R_1X + 4P(Y)(X)_3$$

The mechanism of the reaction is not completely understood. This is only a postulated reaction mechanism and Applicants do not intend to limit their process thereto. The stoichiometry would be adjusted accordingly for preparing the di, tri, etc. phosphonates and phosphinates.

The process of the present invention is carried out at elevated temperature and at least at autogenous pressure. Temperatures of between about 200°C and about 450°C. can be used through temperatures of 250°C. to 350°C. are generally employed. The method of the present invention may conveniently be effected by introducing the individual reactants into a reaction zone capable of withstanding elevated pressure, such as a metal bomb, autoclave, or other pressure vessel, and carrying out the reaction under at least the autogenuous pressure developed by the reactants at the reaction temperature. Pressures of up to 200 atmospheres above the autogenuous pressure can also be used but are less desirable due to the inconvenience of requiring a pressurization system. The time of reaction may vary over relatively wide limits such as between about 1 to 20 hours, but the preferable reaction time has been found to be between about 5 and 15 hours.

In general, the reaction equipment should be a pressure vessel. The vessel should be equipped with an agitation mechanism (a rocker, vibrator, or stirrer) for best results. The reaction with the phosphorus pentasulfide proceeds easily due to the fact that the melting point of the sulfide is about the same as the reaction temperature and the phosphorus pentasulfide is more soluble in the reaction mixture than the phosphorus pentoxide. The melting point of the phosphorus pentoxide, on the other hand, is about 100°C. above the general reaction temperature. The phosphorus pentoxide is a solid at reaction temperatures and tends to cake in the bomb. Agitation as well as supporting the phosphorus pentoxide on a plug of glass wool or porcelain decreases the caking tendency. Also, and since phosphorus pentoxide is decomposed by water, care is to be taken to avoid the presence of water in the system.

The reaction may be carried out in continuous or batchwise systems as desired. The reaction may also be conducted in the presence of diluents which can be gaseous, liquid, or soilid at room temperature such as benzene, toluene, hexane, and various other hydrocarbons such as: ethane, ethylene, propane, cyclohexane, and biphenyl. Also, the trivalent phosphorus compound, $R_1P(X)_2$ can often be present in excess to act as a diluent.

The products of the reaction are purified by conventional methods such as by fractional distillation of liquids and crystallization or extraction of solid products. The identification of products is achieved by conventional methods, such as elemental analysis, and gas chromatography for purity and mass spectrometer and nuclear magnetic resonance phosphorus NMR and infrared analysis to establish structure.

In some cases, it has been found desirable, and possibly essential to conduct the present reaction in the presence of diluents if high yields are desired. In certain instances, the diluent is actually a reactant and becomes part of the product. When an aryl monohalide is reacted with a trivalent phosphorus compound ($R_1P(X)_2$) and $P_4Y_{10}$, there is a significant tendency to replace the halogen of the trivalent phosphorus compound with the aryl compound without removing the halogen from the aryl ring as follows:

IX 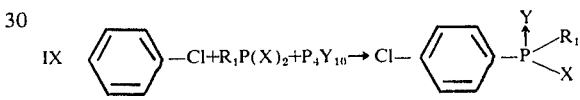

rather than the desired:

X 

This side reaction can be significantly reduced by conducting the reaction in a diluent of the group of benzene which is the parent hydrocarbon from which the aryl halide ($RX_n$) reactant is derived. Benzene is preferred in the reaction with chlorobenzene. Other diluents such as chlorotoluene could be used but these would provide mixtures of various products. The use of a different diluent might be desirable in the preparation of multiple function mixtures, particularly in the hydraulic fluid field. At least 0.1 to about 10 moles of the diluent per mole of $RX_n$ reactant is required to be present though best results are obtained using about an equimolar amount.

The products of the present invention are monohalides or dihalides of pentavalent phosphorus and, therefore, can be subject to all the known reactions which such compounds undergo. The compounds of the invention can be used as intermediates to prepare plasticizers and flame retardants as per the following illustrative reaction scheme:

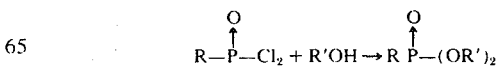

The compounds of the invention can also be used to make insecticides as illustrated by the process for making O-ethyl O-para-nitrophenyl phenylphosphonothioate as per the following illustrative reaction scheme:

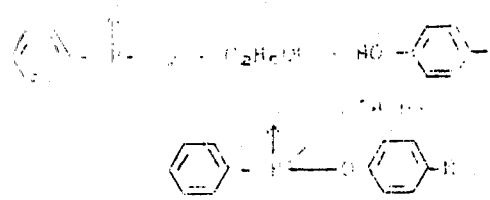

and for making O-ethyl S-phenyl ethylphosphonothioate as per the following illustrative reaction scheme:

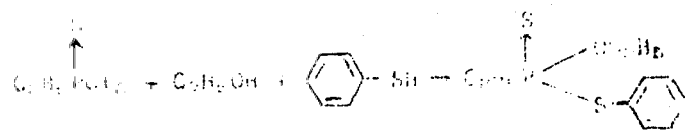

The compounds of the invention can be hydrolyzed to form the corresponding phosphonic (such as benzenephosphonic acid) or phosphinic acids. The sodium salts of benzenephosphonic acid are known nylon stabilizers. There are also many known uses for chloromethylphosphonic dichloride and chloromethylphosphinic chloride as well as chloromethylphosphonothioic dichloride. Other uses would be obvious to one skilled in the art.

In the operation of the process of the invention with ethyl monohalide it was noticed that product formation suffered. It was determined that a new chemical composition was formed having the structural formula:

XI 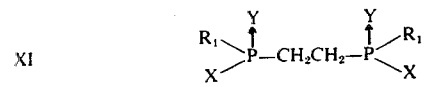

wherein $R_1$, X and Y are as defined herebefore. It has, however, been found that the reaction which forms the aforementioned new composition of matter can be retarded by conducting the reaction between the ethyl halide, the trivalent phosphorus compound, and the phosphorus pentoxide or pentasulfide in a hydrocarbon diluent such as benzene, ethane, cyclohexane, ethylene, and the like. The most effective results were obtained using ethylene.

The compounds of formula XI above can be generically described by the formula:

XI (a) 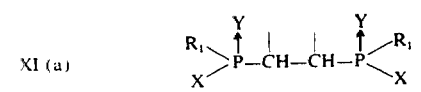

wherein the free valence bonds are satisfied with members of the group of hydrogen, or alkyl of from 1–4 carbons, $R_1$, X, and Y being as defined hereinbefore. These compounds are prepared by using an alkyl dihalide of the formula:

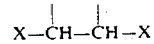

in the general process outlined in this invention.

It has also been unexpectedly found that the sulfur compounds of formula XI (a) of the invention can be prepared by reacting an alkyl monohalide with the $R_1P(X)_2$ compound in the presence of the $P_4S_{10}$ compound. This is unexpected and involves a different reaction sequence from that described above since there is only one halogen on the alkyl compound available for reaction. All other reaction conditions are as outlined above in connection with the general process described hereinbefore.

It has also been unexpectedly found that the compounds can be prepared by a third process involving the use of an ethylenically unsaturated compound such as ethylene, propylene, butylene, and the like. The two phosphorus groups add, utlimately, across the double bond. The position of the double bond will dictate the configuration of the central portion of the molecule, e.g., ethylene will provide a straight chain, propylene a branched chain of methyl, 1,2 butene, a branch of ethyl, 2,3 butene, 2 branches of methyl, etc. Again, as in the case of the two previously described reactions, all of the conditions of the general reaction are applicable to this reaction.

It has also been found that numerous other new compounds are prepared by the process of the present invention. These new compounds are summarized in the following formulae:

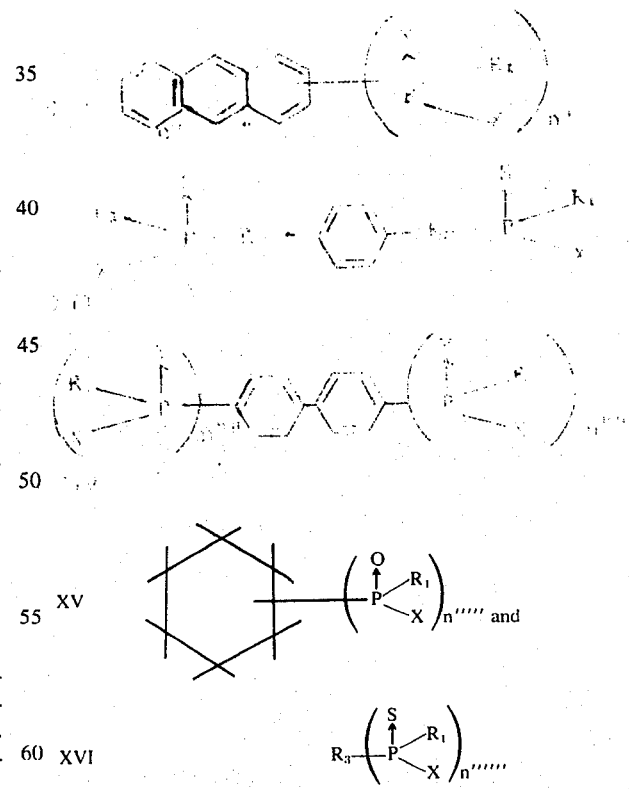

wherein $R_1$, X and Y are as defined hereinbefore, $R_1$ preferably being halogen and more preferably chlorine, X is preferably chlorine; $R_2$ is an alkylene linkage of 1–10 carbon atoms preferably methylene, $R_3$ is an alkyl of 1-20 carbons or cycloalkyl or 5–6 carbons in the ring and $n'$ is an integer of 2 or more, preferably 2; $n''$ equals 0 or 1, preferably 0; $n'''$ equals 0 when $n''$ equals 0 and 0 or 1 when $n''$ equals 1; $n''''$ is an integer of from 1 to 5, preferably 1–2; $n'''''$ is an integer of 2 or more, preferably 2; $n''''''$ is an integer greater than zero, preferably 1–2. All of these compounds contain reactive halogen which can be reacted with an alcohol to form phosphonate or phosphinate esters usable as flame retardants, for polymers such as polyurethanes, and plasticizers for polymers such as polyvinyl chloride as has been outlined hereinbefore. The sulfur compounds are also usable as insecticides as has been outlined hereinbefore. The amine derivatives can also be made by known methods which are useful as additive type flame retardants.

The present invention will be more fully illustrated in the Examples which follow.

EXAMPLE 1

In a 300 cubic centimeter 316 stainless steel rocking autoclave were placed 25.8 grams (0.4 moles) of ethyl chloride, 55.0 grams (0.4 moles) of phosphorus trichloride, and 30.0 grams (0.067 moles) of phosphorus pentasulfide $P_4S_{10}$. While under rocking agitation, the autoclave was slowly heated up to 300°C. over a six hour period. The heating was continued at 300°C. for an additional seven hours. After cooling, the autoclave was vented and the contents of the autoclave were placed in a distillation flask. The contents of the flask was distilled under vacuum and the product fraction separated at a pot temperature of about 75°C. to about 150°C. and a vapor temperature of 60°C. at 25 millimeters of mercury pressure. The yield of product was 21 grams. The product was analyzed and found to provide 19.0% phosphorus, 19.5% sulfur, and 43.6% chlorine as against the theoretical 19.01% phosphorus, 19.6% sulfur, and 43.55 % chlorine for ethylphosphonothioic dichloride. $n_D^{25}$ equals 1.5408 as against the reported $n_D^{25}$ of 1.5410. Nuclear magnetic resonance spectra confirmed structure of the compounds as $CH_3CH_2P(S)Cl_2$.

A second fraction of 7 grams was obtained which distilled at a vapor temperature of 125°C. to 130°C. at 0.05 millimeters of mercury pressure. The product crystallized on cooling. The product was analyzed and found to provide 21.5% phosphorus, 22.5% sulfur and 45% chlorine as against the theoretical 21% phosphorus, 21.6% sulfur, and 48% chlorine for ethane bisphosphonothioic dichloride. Nuclear magnetic resonance spectra confirmed structure of the compound as $Cl_2P(S)CH_2CH_2P(S)Cl_2$.

To demonstrate the effect of temperature on the reaction, Examples 2 and 3 were conducted.

EXAMPLE 2

Example 1 was repeated using the same amount of reactants as in Example 1 and heating the same up to 250°C., and then at 250°C. for 11 hours, yielding 8 grams of $CH_3CH_2P(S)Cl_2$.

EXAMPLE 3

Example 1 was repeated using the same amount of reactants as in Example 1, heating the same up to 275°C. and then at 275°C. for 11 hours, yielding 27.5 grams of $CH_3CH_2P(S)Cl_2$.

EXAMPLE 4

Example 1 was repeated using 35.5 grams (0.55 moles) ethyl chloride, 55.0 grams (0.4 moles) phosphorus trichloride and 30.0 grams (0.067 moles) phosphorus pentasulfide ($P_4S_{10}$). The mixture was heated up to 262°C. and held at that temperature for 15 hours. The product was isolated by distillation yielding 22.4 grams of ethylphosphonothioic dichloride. Nuclear magnetic resonance spectra confirmed structure of the final product.

EXAMPLE 5

In a 300 cubic centimeter 316 standard steel autoclave were placed 55.0 grams (0.4 moles) phosphorus trichloride, 30.0 grams (0.067 moles) phosphorus pentasulfide, 37.0 grams (0.4 moles) n-butyl chloride. While under rocking action the autoclave was heated to 265°C. for 17 hours. The product was isolated by distillation yielding 24 grams of butylphosphonothioic dichloride. The product was analyzed and found to contain 16.3% phosphorus, 16.8% sulfur, and 37.3% chlorine as against a theoretical 16.25% phosphorus, 16.75% sulfur and 37.2% chlorine for butylphosphonothioic dichloride ($C_4H_9PSCl_2$) and an $n_D^{25}$ of 1.5273. Nuclear magnetic resonance spectra showed two isomers to be present in 1:1 molar ratio having the following structure:

$$CH_3(CH_2)_2CH_2PSCl_2 \text{ and } CH_3CH(PSCl_2)CH_2CH_3$$

EXAMPLE 6

Using the same procedure as shown in Example 5, 31 grams (0.4 moles) n-propyl chloride and 55 grams (0.4 moles) phosphorus trichloride and 30 grams (0.067 moles) phosphorus pentasulfide were placed in the autoclave and reacted at 260°C. for 16 hours to obtain 28 grams of propylphosphonothioic dichloride after distillation of the reaction product. The product was analyzed and found to provide 17.3% phosphorus, 18.2% sulfur and 40.0% chlorine as against the theoretical 17.5% phosphorus, 18.1% sulfur and 40.0% chlorine for propylphosphonothioic dichloride ($C_3H_7PSCl_2$) $n_D^{25}$ found 1.5315 nuclear magnetic resonance spectra showed two isomers to be present in 1:2 ratio as follows: 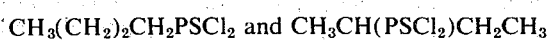 $1(CH_3)_2CHPSCl_2$: $2CH_3CH_2CH_2PSCl_2$.

EXAMPLE 7

In a 1 liter autoclave equipped with a magnetic driven stirrer were placed 102 grams (1.2 moles) dichloromethane ($CH_2Cl_2$), 165 grams (1.2 moles) phosphorus trichloride and 60 grams (0.2 moles) phosphorus pentoxide. The autoclave was heated with stirring at 280°C. for 4½ hours and at 295°C. for 16½ hours. After cooling the autoclave was vented and 0.16 moles HCl gas were found. The contents of the autoclave were distilled under vacuum after collecting 56.5 grams of unreacted phosphorus trichloride (34% of starting weight) along with 35 grams phosphorus oxychloride. The product fraction separated at a vapor temperature of 90°C. – 110°C. at 100 millimeters of mercury pressure. The yield of product was 56 grams. The product was analyzed and found to provide 18.4% phosphorus and 62.75% chlorine as against the theoretical 18.5% phosphorus and 63.5% chlorine for chloromethylphosphonic dichloride ($ClCH_2POCl_2$). $n_D^{25}$ found 1.4960; against commercial sample of chloromethylphosphonic dichloride 1.4955. Nuclear magnetic resonance spectra confirmed structure of the compound as $ClCH_2POCl_2$. Before the distillation, gas/liquid chromatography and nuclear magnetic resonance analysis indicated 8.5 grams methylphosphonic dichloride ($CH_3POCl_2$) was also present which was not isolated in pure form.

EXAMPLE 8

In a 300 cubic centimeter 316 stainless steel rocking autoclave were placed 22 grams (0.4 moles) methyl chloride gas; 55 grams (0.4 moles) phosphorus trichloride, and 30 grams (0.067 moles) phosphorus pentasulfide. The autoclave was heated at 265°C. with rocking for 16 hours. After cooling and venting the contents of the autoclave were placed in a distillation flask. The contents of the flask were distilled to remove 18.5 grams unreacted phosphorus trichloride, 11.3 grams thiophosphoryl chloride ($PSCl_3$) (an expected reaction by-product) and 39 grams of product. The product was analyzed and found to provide 20.8% phosphorus, 21.0% sulfur and 47.8% chlorine as against the theoretical 20.8% phosphorus, 21.4% sulfur and 47.6% chlorine for methylphosphonothioic dichloride. Nuclear magnetic resonance spectra confirmed the structure of the compound as $CH_3PSCl_2$.

EXAMPLE 9

Dichlormethane reacted with phosphorus pentasulfide and phosphorus trichloride gives only methylphosphonothioic dichloride.

In a 300 cubic centimeter 316 standard steel autoclave were placed 60 grams (0.7 moles) dichloromethane ($CH_2Cl_2$), 55 grams (0.4 moles) phosphorus trichloride, and 34 grams (0.075 moles) phosphorus pentasulfide. The autoclave was heated at 260°C. for 4½ hours and at 275°C. for 10 hours. After cooling the autoclalve was vented and 0.155 moles HCl collected. The contents of the autoclave were placed in a distillation flask. The contents of the flask were distilled and 26 grams of unreacted dichloromethane and 29 grams of unreacted phosphorus trichloride were collected. The distillation was then conducted under vacuum and 25 grams thiophosphoryl chloride ($PSCl_3$) were collected at 30°C. to 45°C. vapor temperature at 12 millimeters of mercury pressure. At this pressure, 12.5 grams of product distilled at a vapor temperature of 50°C. to 55°C. Nuclear magnetic resonance gas/liquid chromatography and index of refraction indicated the product to be methylphosphonothioic dichloride - $CH_3PSCl_2$. This is not the expected product $ClCH_2PSCl_2$. All analysis agreed with product obtained from Example 8.

EXAMPLE 10

In a 300 cubic centimeter 316 stainless steel autoclave were placed 90 grams (0.8 moles) of chlorobenzene, 55 grams (0.4 moles) of phosphorus trichloride and 20 grams (0.0705 moles) of phosphorus pentoxide placed between 5 grams of heat resistant glass wool to prevent caking. While under rocking action, the autoclave was rapidly heated up to 320°C. over a period of approximately 1 hour. The heating was continued for an additional 14 hours. After cooling, the contents of the autoclave were transferred to a distillation flask. After removing the low boiling materials at 80°C. and 400 millimeters of mercury pressure, the product, phenylphosphonic dichloride, was distilled at 80°C. to 110°C. under high vacuum (0.1 millimeter of mercury). 54 grams of product were obtained having an $n_D^{25}$ of 1.5680 in comparison to the reported $n_D^{25}$ of 1.5589 for phenylphosphonic dichloride. Upon redistillation there was obtained 32 grams of product having a boiling point at 0.1 millimeter of mercury of 80°C. to 85°C. and an $n_D^{25}$ of 1.5600.

Also obtained were 7 grams of chlorophenylphosphonic dichloride which has an observed boiling point at 0.1 millimeter of mercury of 85°C. to 87°C. and an observed $n_D^{25}$ of 1.5730 as dichloride against reported $n_D^{25}$ for para-chlorophenylphosphonic dichloride of 1.5743.

The amount of chlorophenylphosphonic dichloride prepared in the reaction was found to be lowered by the addition to the reaction of benzene as per the following example.

EXAMPLE 11

In an autoclave was placed 32 grams (0.29 moles) of chlorobenzene, 45 grams (0.58 moles) of benzene, 55 grams (0.4 moles) of phosphorus trichloride and 20 grams (0.07 moles) of phosphorus pentoxide. These materials were reacted in accordance with the procedure of Example 10. Upon cooling, the products were isolated by distillation. The first or low boiling fraction contained 15.1 grams of unreacted phosphorus trichloride. The product fraction boiling at 85°C. to 125°C. (0.1 millimeter of mercury) yielded 48 grams of product, phenylphosphonic dichloride, having an $n_D^{25}$ of 1.5590 as against the reported value for phenylphosphonic dichloride of $n_D^{25}$ of 1.5589.

The residue, totalling 30 grams, was treated with 120 grams of phosphorus pentachloride in phosphorus oxychloride. This mixture was distilled and 16.2 grams of additional phenylphosphonic dichloride were isolated giving a total yield of 64.2 grams. Upon redistillation there was obtained 59.3 grams of product having an $n_D^{25}$ of 1.5579 as against the reported $n_D^{25}$ OF 1.5589.

When the reaction of chlorobenzene, phosphorus trichloride and phosphorus pentoxide was run at 285°C. and 300°C., the yield of product was lower and some unreacted phosphorus pentoxide remained in the autoclave. These runs were made without the aid of the glass wool to prevent the caking of the phosphorus pentoxide.

EXAMPLE 12

The procedure of Example 10 was repeated using 33.6 grams (0.3 moles) of chlorobenzene, 41.1 grams (0.3 moles) of phosphorus trichloride and 22.2 grams (0.05 moles) of phosphorus pentasulfide. The reaction mixture was heated at 300°C. for 7 hours. The product, phenylphosphonothioic dichloride, in a yield of 18.3 grams, was isolated by distillation and redistillation, and had a boiling point of 58°C. and 62°C. (0.02 millimeters of mercury) and an $n_D^{25}$ of 1.6235 as against the reported $n_D^{25}$ of 1.6220 for phenylphosphonothioic dichloride.

EXAMPLE 13

The procedure of Example 1 was repeated using 65 grams (0.4 moles) 1-chloronaphthalene, 82 grams (0.6 moles) phosphorus trichloride, and 30 grams (0.067 moles) phosphorus pentasulfide. The autoclave was heated in one hour to 250°C. and kept at this temperature for 18 hours. After cooling the contents of the autoclave were poured into a distillation flask. A low boiling fraction comprising essentially 45 grams phosphorus trichloride and 15 grams of thiophosphoryl chloride was removed. 35 grams of product, 1-naphthalenephosphonothioic dichloride was recovered having a boiling point range of 125°C–130°C. under high vacuum (0.001 millimeters of mercury). The product was analyzed and found to contain 11.9% phosphorus, 26.1% chlorine, and 14.3% sulfur as against a theoretical 11.9% phosphorus, 27.2% chlorine, and 12.3% sulfur for 1-naphthalenephosphonothioic dichloride ($C_{10}H_7PSCl_2$). Structure was confirmed by nuclear magnetic resonance spectra.

EXAMPLE 14

Using the same procedure as shown in Example 1, 65 grams (0.4 moles) 1-chloronaphthalene, 55 grams (0.4 mole) phosphorus trichloride, 20 grams (0.07 moles) phosphorus pentoxide and 47 grams of benzene as diluent were placed in the autoclave along with 5 grams of glass wool and heated to 272°C. in one hour. The autoclave was kept at this temperature for 26 hours. After cooling the contents of the autoclave were place in a distillation flask and distilled to obtain the product. The product, 1-naphthalenephosphonic dichloride had a boiling point of 140°C. at high vacuum (0.1 millimeters of mercury). The 30 grams of product was analyzed and found to contain 12.5% phosphorus and 29.6% chlorine as against a theoretical 12.7% phosphorus and 29.1% chlorine for 1-naphthalenephosphonic dichloride ($C_{10}H_7POCl_2$) and an $n_D^{25}$ of 1.6387. Structure was confirmed by nuclear magnetic resonance spectra.

EXAMPLE 15

In an autoclave were placed 21.5 grams (0.1 moles of 1,2,4,5-tetrachlorobenzene, 82 grams (0.6 moles) of phosphorus trichloride and 30 grams (0.067 moles) of phosphorus pentasulfide. While under rocking action, the autoclave was heated rapidly to 275°C. and kept at this temperature for 14 hours. After cooling, the contents of the autoclave were transferred to a distillation flask. After removing the low boiling material there remained 41 grams of dark syrup which resisted distillation. The theoretical product is:

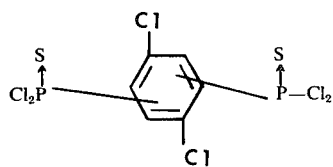

The composition of the syrup was established by converting the material to a phosphonic acid by hydrolysis in refluxing 10% aqueous hydrochloric acid for 4 days. After cooling, 21 grams of crystalline product, dichlorophenylene diphosphonic acid of the formula:

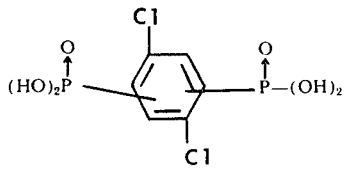

was obtained. The product was analyzed and found to provide 19.4% phosphorus and 20.8% chlorine as against the theoretical 20.2% phosphorus and 23.0% chlorine for dichlorophenylene diphosphonic acid ($C_6H_6Cl_2O_6P_2$). Titration with aqueous caustic indicated the material to be a dibasic acid of molecular weight of 301 compared to a theoretical molecular weight of 307 for dichlorophenylene diphosphonic acid.

EXAMPLE 16

In an autoclave were placed 44.8 grams (0.2 moles) mixed isomers of dichlorobiphenyl, 82 grams (0.6 moles) of phosphorus trichloride and 20 grams (0.07 moles) phosphorus pentoxide. While under rocking action, the autoclave was heated to 300°C. rapidly, and kept at this temperature for 19 hours. After cooling, the contents of the autoclave were transferred to a distillation flask. After removing low boiling material there remained 49 grams of liquid. The main product, chlorobiphenylphosphonic dichloride was distilled at 155°C–157°C. under high vacuum (0.001 millimeters of mercury). 9 grams of product was obtained having an $n_D^{25}$ of 1.6355. Aqueous caustic titration to liberate ionic chloride and phosphonic acid indicated the product to contain 22.0% hydrolyzable chlorine as against the theoretical of 23.2% hydrolyzable chloride; and dibasic acid whose starting molecular weight equals 310 as against the theoretical molecular weight of 306 for chlorobiphenylphosphonic dichloride. Nuclear magnetic resonance spectra is consistent with proposed structure.

EXAMPLE 17 biphenyl-bisphosphonic dichloride is prepared by reacting 0.2 moles of the product of Example 16 with 82 grams (0.6 moles) of phosphorus trichloride and 20 grams (0.07 moles) of phosphorus pentoxide under the conditions of Example 16.

EXAMPLE 18

In an autoclave were placed 67 grams (0.6 moles) chlorobenzene, 26 grams (0.3 moles) ethylphosphonous dichloride and 22 grams (0.05 moles) phosphorus pentasulfide. While rocking the autoclave was heated rapidly to 260°C. and kept at this temperature for 24 hours. After cooling, the contents of the autoclave were transferred to a distillation flask. After removing the low boiling components, the product (ethyl)phenylphosphinothioic chloride was distilled at 95°C.–100°C. under high vacuum (0.01 millimeters of mercury), 17 grams of product was obtained having an $n_D^{25}$ of 1.6156 and having the expected nuclear magnetic resonance spectra for the product

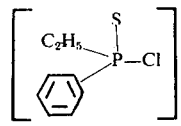

EXAMPLE 19

The same product as in Example 18 was obtained by reacting 54 grams (0.3 moles) phenylphosphonous dichloride, 39 grams (0.6 moles) ethyl chloride and 22 grams (0.05 moles) phosphorus pentasulfide in an au-

17 toclave at 270°C. for 19 hours, using the same procedure outlined in Example 18.

EXAMPLE 20

Using the procedure of Example 1, α,α'xylene bisphosphonothioic dichloride is prepared using 17.5 grams (0.1 moles) of α,α'-dichloroxylene, 27.5 grams (0.2 moles) of phosphorus trichloride, and 7.5 grams (0.0163 moles) of phosphorus pentasulfide ($P_4S_{10}$).

EXAMPLE 21

Using the procedure of Example 1, cyclohexane bisphosphonic dichloride is prepared using 14.3 grams (0.1 moles) of dichlorocyclohexane, 27.5 grams (0.2 moles) of phosphorus trichloride, and 4.63 grams (0.0163 moles) of phosphorus pentoxide ($P_4O_{10}$).

EXAMPLE 22

Using the procedure of Example 1, cyclohexane phosphonothioic dichloride is prepared using 11.8 grams (0.1 mole) of chlorocyclohexane, 13.75 grams (0.1 moles) of phosphorus trichloride, and 3.75 grams (0.0081 moles) of phosphorus pentasulfide ($P_4S_{10}$).

EXAMPLE 23

Using the procedure of Example 1, cyclohexane bisphosphonothioic dichloride is prepared using 14.3 grams (0.1 moles) of dichlorocyclohexane, 27.5 grams (0.2 moles) of phosphorus trichloride and 7.5 grams (0.0163 moles) of phosphorus pentasulfide ($P_4S_{10}$).

EXAMPLE 24

In a 300 millimeter 316 stainless steel autoclave were placed 12 grams (0.4 moles) ethylene, 110 grams (0.8 moles) phosphorus trichloride and 30 grams (0.067 moles) phosphorus pentasulfide. The autoclave was rocked and heated to 260°C. in one hour. It was kept at this temperature for 18 hours. After cooling, the solid contents of the autoclave were placed in a distillation flask and the unreacted phosphorus trichloride removed under vacuum. Its weight was 34 grams. The crude yield of product was 88 grams. A small sample of this material was distilled under high vacuum and the structure of the product is ethanebisphosphonothioic dichloride ($Cl_2P(S)CH_2CH_2P(S)Cl_2$) having the same nuclear magnetic resonance spectra as the second fraction of material isolated in Example 1. In order to convert some by-products which render the distillation difficult, due to gas liberation, the product was treated with $PCl_5$ after dissolving in $POCl_3$. After such treatment, the distilled yield of ethanebisphosphonothioic dichloride was 53 grams whose structure was confirmed by nuclear magnetic resonance spectra analysis.

EXAMPLE 25

In a 300 millimeter 316 stainless steel autoclave were placed 12 grams (0.4 moles) ethylene, 110 grams (0.8 moles) phosphorus trichloride, and 20 grams (0.07 moles phosphorus pentoxide mixed with 5 grams of glass wool to prevent caking. while rocking, the autocalve was heated to 250°C. in one hour and kept at this temperature for 18 hours. After cooling, the contents of the autoclave were removed. There was considerable solid material trapped in the glass wool which was washed with chloroform to remove the excess phosphorus trichloride. This product is assumed to be ethane

18 bisphosphonic dichloride. In order to free the product from the glass wool by converting it to a water soluble phosphonic acid, it was placed in refluxing 10% aqueous hydrochloric acid for 8 hours. The solution was cooled and the glass wool removed by filtration. The filtrate was evaporated to remove the solvent. The resultant ethane bisphosphonic acid weight was 37 grams. Nuclear magnetic resonance spectra analysis of this material showed it to be 70 % ethanebisphosphonic acid and the remainder a polyethanebisphosphonic acid type material. A sample of this material, when titrated with aqueous caustic, showed it to be a dibasic acid having a neutral equivalent of 101. The neutral equivalent of ethane-bisphosphonic acid is 104 (molecular weight is 208).

All other compounds within the scope of the invention can be easily prepared by using the foregoing procedures and the corresponding reactants, some of which have been specifically listed hereinbefore, and the remainder being within the grasp of those skilled in the art.

The present invention is defined in the claims which follow.

What is claimed is:

1. A method for preparing compounds of the formula:

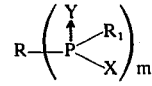

wherein R is a $C_1$ to $C_{20}$ alkyl radical, cycloalkyl of 5–6 carbons in the ring, an aryl radical of up to 3 fused rings, and biphenyl, $R_1$ represents a $C_1$ to $C_{20}$ alkyl radical, cycloalkyl of 5–6 carbons on the ring, an aryl radical of up to 3 fused rings, biphenyl, or a halogen of chlorine, or bromine, X is a halogen of chlorine or bromine, and Y is a chalcogen of oxygen or sulfur, and m is an integer between 1 and n, defined hereinafter, inclusive, comprising reacting, under at least an autogenous pressure at a temperature of from about 200°C. to about 450°C. an alkyl or aryl halide of the formula:

wherein R is as defined above, and X is a halogen of chlorine, or bromine, and n is an integer and represents the number of haolgens attached to the R group, with a trivalent phosphorus compound of the formula

wherein $R_1$ and X are as defined above, in the presence of a phosphorus compound of the formula:

wherein Y is a chalcogen of oxygen or sulfur.

2. The method as recited in claim 1 wherein $R_1$ is halogen.

3. The method as recited in claim 1 wherein $R_1$ and X are chlorine.

4. The method as recited in claim 1 wherein Y is oxygen.

5. The method as recited in claim 1 wherein Y is sulfur.

6. The method as recited in claim 1 wherein R is a $C_1$ to $C_4$ alkyl.

7. The method as recited in claim 1 wherein R is aryl of one ring.

8. The method as recited in claim 1 wherein $n$ is 1 and $m$ is 1.

9. The method as recited in claim 1 wherein said reaction is conducted at a temperture of from about 250°C. to about 350°C.

10. The method recited rcited in claim 1 wherein R is a $C_2$ alkyl and $n$ is 1 and wherein the reaction mixture further includes a hydrocarbon diluent selected from the group consisting of benzene, ethane, cyclohexane, and ethylene.

11. The method as recited in claim 10 wherein said diluent is ethylene.

12. The method as recited in claim 1 wherein R is an aryl radical of up to 3 fused rings, and wherein the reaction mixture further includes a compound of the formula RH wherein R is the same parent radical forming the $R(X)_n$ used in the reaction.

13. The method as recited in claim 12 wherein said aryl halide is chlorobenzene.

14. The method as recited in claim 12 wherein the trivalent phosphorus compound is phosphorus trichloride.

15. The method as recited in claim 12 wherein the phosphorus compound is $P_4O_{10}$.

16. The method as recited in claim 12 wherein said phosphorus compound is $P_4S_{10}$.

17. The method as recited in claim 12 wherein said diluent is benzene.

18. The method as recited in claim 12 wherein said reaction is conducted at a temperature of from 250°C. to 350°C.

19. The method as recited in claim 15 wherein the reaction is conducted in the presence of glass wool.

20. The method as recited in claim 12 wherein said aryl halide is chlorobenzene, said trivalent phosphorus compound is phosphorus trichloride, and said diluent is benzene.

21. Compounds of the formula:

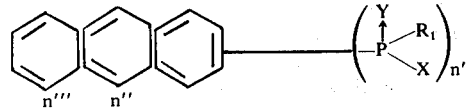

wherein $n'$ is an integer of 2 or more, $n''$ equals 0 or 1, $n'''$ is 0 when $n''$ is o, $n'''$ is 0 or 1 when $n''$ is 1; wherein Y is a chalcogen of oxygen or sulfur, X is a halogen of chlorine, or bromine, and $R_1$ is a $C_1$ to $C_{20}$ alkyl, cycloalkyl of 5–6 carbons in the ring, an aryl radical of up to 3 fused rings, or biphenyl.

22. Compounds as recited in claim 21 wherein Y is oxygen.

23. Compounds as recited in claim 21 wherein Y is sulfur.

24. Compounds as recited in claim 21 wherein $n''$ is 0.

25. Compounds as recited in claim 21 wherein $n'$ is 2.

26. Compounds of the formula:

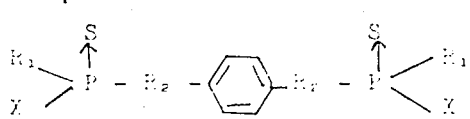

wherein $R_1$ is a $C_1$ to $C_{20}$ alkyl radical, cycloalkyl of 5–6 carbons in the ring, an aryl radical of up to 3 fused rings, or biphenyl, $R_2$ is an alkylene linkage of 2–10 carbons, and X is a halogen of chlorine, or bromine.

27. Compounds as recited in claim 26 wherein X is chlorine.

28. Compounds as recited in claim 26 wherein $R_2$ is ethylene.

29. Compounds of the formula:

wherein Y is a chalcogen of oxygen or sulfur, $R_1$ is a $C_1$ to $C_{20}$ alkyl radical, cycloalkyl of 5–6 carbons in the ring, an aryl radical of up to 3 fused rings, biphenyl, or a halogen of chlorine, or bromine, X is a halogen of chlorine or bromine and $n''''$ is an integer of 1–5.

30. Compounds as recited in claim 29 wherein Y is oxygen.

31. Compounds as recited in claim 29 wherein Y is sulfur.

32. Compounds as recited in claim 29 wherein $R_1$ is halogen.

33. Compounds as recited in claim 29 wherein $R_1$ is chlorine.

34. Compounds as recited in claim 29 wherein X is chlorine.

35. Compounds as recited in claim 29 wherein $n''''$ is an integer of from 1 to 2.

36. Compounds of the formula:

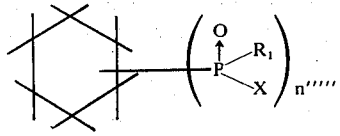

wherein $R_1$ is a $C_1$ to $C_{20}$ alkyl radical, cycloalkyl of 5–6 carbons in the ring, an aryl radical of up to 3 fused rings, biphenyl, or a halogen of chlorine or bromine, X is a halogen of chlorine or bromine, and $n'''''$ is an integer of 2 or more.

37. Compounds as recited in claim 36 wherein $R_1$ is halogen.

38. Compounds as recited in claim 36 wherein $R_1$ is chlorine.

39. Compounds as recited in claim 36 wherein X is chlorine.

40. Compounds as recited in claim 36 wherein $n'''''$ is 2.

41. A process for preparing compounds of the formula:

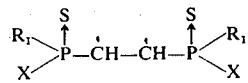

wherein $R_1$ is a $C_1$ to $C_{20}$ alkyl radical, cycloalkyl of 5–6 carbons in the ring, an aryl radical of up to 3 fused rings, biphenyl, or a halogen of chlorine or bromine, and X is a halogen of chlorine or bromine, the free valence bonds being satisfied by hydrogen or $C_1$–$C_4$ alkyl, comprising reacting, under at least autogenous pressure at a temperature of from about 200°C. to about 450°C. an alkyl monohalide of the formula:

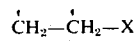

with a phosphorus compound of the formula:

$$R_1P(X)_2$$

in the presence of phosphorus pentasulfide, $R_1$ and X being as defined hereinbefore.

42. The process as recited in claim 41 wherein $R_1$ and X are chlorine.

43. The process as recited in claim 41 wherein the free bonds of the alkyl monohalide are satisfied by hydrogens.

44. A process for preparing compounds of the formula:

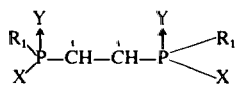

wherein $R_1$ is a $C_1$ to $C_{20}$ alkyl radical, cycloalkyl of 5–6 carbons in the ring, an aryl radical of up to 3 fused rings, biphenyl, or aa halogen of chlorine or bromine, Y is a chalcogen of oxygen or sulfur, and X is a halogen of chlorine, or bromine, the free valence bonds being satisfied by hydrogen or $C_1$–$C_4$ alkyl, comprising reacting, under at least autogenous pressure, at a temperature of from about 200°C. to about 450°C. an ethylenically unsaturated compound of the formula:

$$\overset{\cdot}{H}C{-}\overset{\cdot}{C}H$$

with a phosphorus compound of the formula:

$$R_1P(X)_2$$

in the presence of a phosphorus compound of the formula $$P_4Y_{10}$$

$R_1$, X and Y being as defined hereinbefore.

45. The process as recited in claim 41 wherein the free valence bonds of the ethylenically unsaturated compound are satisfied by hydrogens.

46. The process as recited in claim 41 wherein $R_1$ and X are chlorine.

47. The process as recited in claim 41 wherein Y is sulfur.

48. Compounds of the formula:

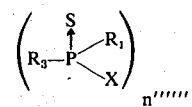

wherein $R_3$ is cycloalkyl of 5–6 carbons in the ring, $R_1$ is a $C_1$ to $C_{20}$ alkyl radical, cycloalkyl of 5–6 carbons in the ring, an aryl radical of up to 3 fused rings, biphenyl, or a halogen of chlorine or bromine, X is a halogen of chlorine or bromine and $n''''''$ is an integer of 2.

49. Compounds as recited in claim 48 wherein $R_1$ is halogen.

50. Compounds as recited in claim 48 wherein $R_1$ is chlorine.

51. Compounds as recited in claim 48 wherein X is chlorine.

* * * * *

UNITED STATES PATENT AND TRADEMARK OFFICE
CERTIFICATE OF CORRECTION

PATENT NO. : 3,897,491
DATED : July 29, 1975
INVENTOR(S) : Arthur D.F. Toy et al It is certified that error appears in the above-identified patent and that said Letters Patent are hereby corrected as shown below:

Column 1, Line 16

Change "Volum" to -- Volume

Column 1, Line 20

Delete " + AlCl3, X H₂O + 2XHCl"
and add  + AlCl$_3$, X H$_2$O + 2XHCl

Column 9, Lines 6-12

Misprinted formula which should read as follows:

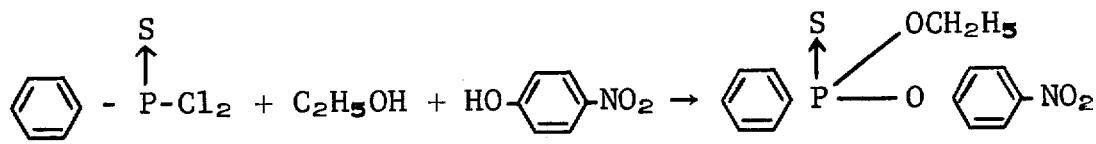

Column 9, Lines 15-20

Misprinted formula which should read as follows:

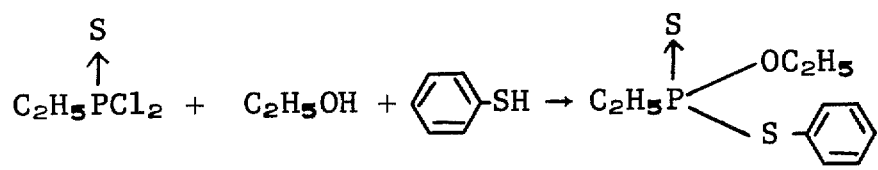

UNITED STATES PATENT AND TRADEMARK OFFICE
CERTIFICATE OF CORRECTION

PATENT NO. : 3,897,491
DATED : July 29, 1975
INVENTOR(S) : Arthur D.F. Toy et al Page 2

It is certified that error appears in the above-identified patent and that said Letters Patent are hereby corrected as shown below:

Column 10, Lines 33-51

Misprinted formula which should read as follows:

XII 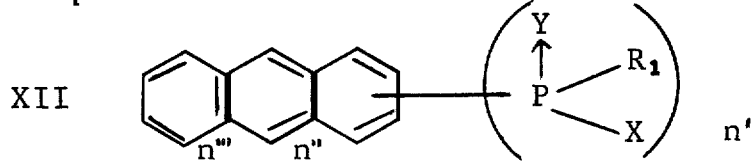

XIII 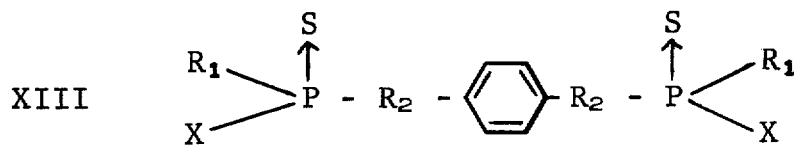

XIV 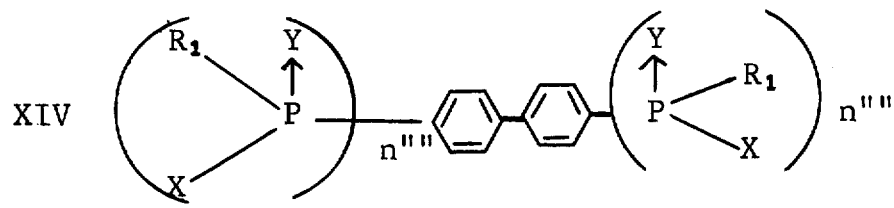

Column 10, Line 67

Change "or" to -- of

Column 13, Line 53

Change "not" to -- not

UNITED STATES PATENT AND TRADEMARK OFFICE
CERTIFICATE OF CORRECTION

Page 3

PATENT NO. : 3,897,491
DATED : July 29, 1975
INVENTOR(S) : Arthur D.F. Toy et al It is certified that error appears in the above-identified patent and that said Letters Patent are hereby corrected as shown below:

Column 14, Line 13

Delete "dichloride"

Column 17, Line 62

Change "calve" to -- clave

Column 19, Line 6

Change "recited rcited" to -- as recited

Column 19, Line 46

Change "o" to -- O

Column 19, Line 60

Misprinted formula which should read as follows:

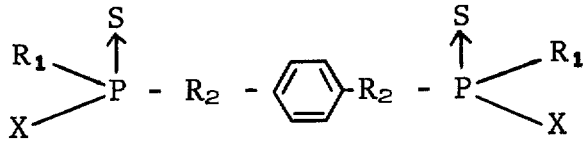

Column 21, Line 19

Change "aa" to - a

UNITED STATES PATENT AND TRADEMARK OFFICE
CERTIFICATE OF CORRECTION

PATENT NO. : 3,897,491
DATED : July 29, 1975
INVENTOR(S) : Arthur D.F. Toy et al Page 4

It is certified that error appears in the above-identified patent and that said Letters Patent are hereby corrected as shown below:

Column 22, Line 6

Change "41" to -- 44

Column 22, Line 9

Change "41" to -- 44

Column 22, Line 11

Change "41" to -- 44

Signed and Sealed this twenty-third Day of December 1975

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,897,491
DATED : July 29, 1975
INVENTOR(S) : Arthur D. F. Toy et al.

It is certified that error appears in the above-identified patent and that said Letters Patent are hereby corrected as shown below:

At column 21, line 27, claim 44, "HC—CH" should read --HC=CH--.

Signed and Sealed this

Thirty-first Day of May 1977

[SEAL]

Attest:

RUTH C. MASON
*Attesting Officer*

C. MARSHALL DANN
*Commissioner of Patents and Trademarks*